United States Patent [19]

Richards

[11] 4,184,507
[45] Jan. 22, 1980

[54] BALL VALVE

[75] Inventor: Cecil G. Richards, Aspley, Australia

[73] Assignee: B. C. Richards & Co. Pty. Ltd., Geebung, Australia

[21] Appl. No.: 898,440

[22] Filed: Apr. 20, 1978

[51] Int. Cl.² ............................ F16K 27/00; F16K 5/06
[52] U.S. Cl. ............................................ 137/375; 251/315
[58] Field of Search ................... 137/375; 251/304, 315

[56] References Cited

U.S. PATENT DOCUMENTS

| | | | |
|---|---|---|---|
| 2,643,089 | 6/1953 | Mueller et al. | 251/150 |
| 3,093,353 | 6/1963 | Wakeman | 244/122 AH |
| 3,124,334 | 3/1964 | Szohatzky | 251/214 |
| 3,227,174 | 1/1966 | Yost | 137/375 |
| 3,276,740 | 10/1966 | Clark | 251/315 |
| 3,334,650 | 8/1967 | Lowrey et al. | 137/375 |
| 3,336,938 | 8/1967 | Schenck, Jr. | 137/375 |
| 3,336,939 | 8/1967 | Freed et al. | 137/375 |
| 3,406,707 | 10/1968 | Schenck, Jr. | 137/375 |
| 3,438,388 | 4/1969 | Schenck, Jr. | 137/375 |
| 3,450,151 | 6/1969 | Heutzenroeder | 137/375 |
| 3,531,081 | 9/1970 | Scaramucci | 251/151 |
| 3,575,379 | 4/1971 | Hoos | 251/314 |
| 3,703,910 | 11/1972 | Smith | 137/375 |
| 3,825,030 | 7/1974 | Kalsi | 137/375 |
| 3,916,943 | 11/1975 | Hester et al. | 137/375 |
| 3,948,284 | 4/1976 | Walworth | 137/375 |

FOREIGN PATENT DOCUMENTS

| | | | |
|---|---|---|---|
| 2363993 | 9/1974 | Fed. Rep. of Germany | 137/375 |
| 2305663 | 10/1976 | France | 137/375 |
| 909820 | 11/1962 | United Kingdom | 137/382 |

Primary Examiner—Martin P. Schwadron
Assistant Examiner—A. Michael Chambers
Attorney, Agent, or Firm—Donald D. Jeffery

[57] ABSTRACT

A ball-valve having an apertured ball which is rotated to connect or close off inlet and outlet passages from one another and a replaceable resilient liner encasing the ball and filling the body cavity around the ball and its stem. The liner may include a portion to wipe the ball surface clean as the ball is rotated.

2 Claims, 2 Drawing Figures

BALL VALVE

BACKGROUND OF INVENTION

This invention relates to ball-valves i.e. valves in which an apertured ball is rotated to connect or close off inlet and outlet passages from one another.

DESCRIPTION OF THE PRIOR ART

Problems arise in such valves when they have to carry slurries or other liquid-solid mixtures, because as the valve is turned on and off, the line media can lodge in the body cavity around the ball and its stem. This material tends to harden and make the ball difficult to turn. In extreme cases this may result in twisting or breakage of the valve stem.

BRIEF SUMMARY OF THE INVENTION

An object of the invention is to prevent or minimize this effect.

A further object is to reduce wear on the valve with abrasive materials flowing through it.

The invention accordingly comprises a ball-valve including a replaceable resilient liner encasing the ball and filling the body cavity around the ball and its stem.

The liner may be made with a raised circular portion at each end of the ball surrounding the ball aperture in valve-open position, which wipes the ball surface clean as it is turned.

The ball itself may be encased in a resilient liner contacting the surrounding body liner.

BRIEF DESCRIPTION OF THE DRAWINGS

In order that the invention may be better understood, the invention will be further described with reference to the accompanying drawings, in which.

DETAILED DESCRIPTION OF THE PREFERRED EMBODIMENT

Figure 1:
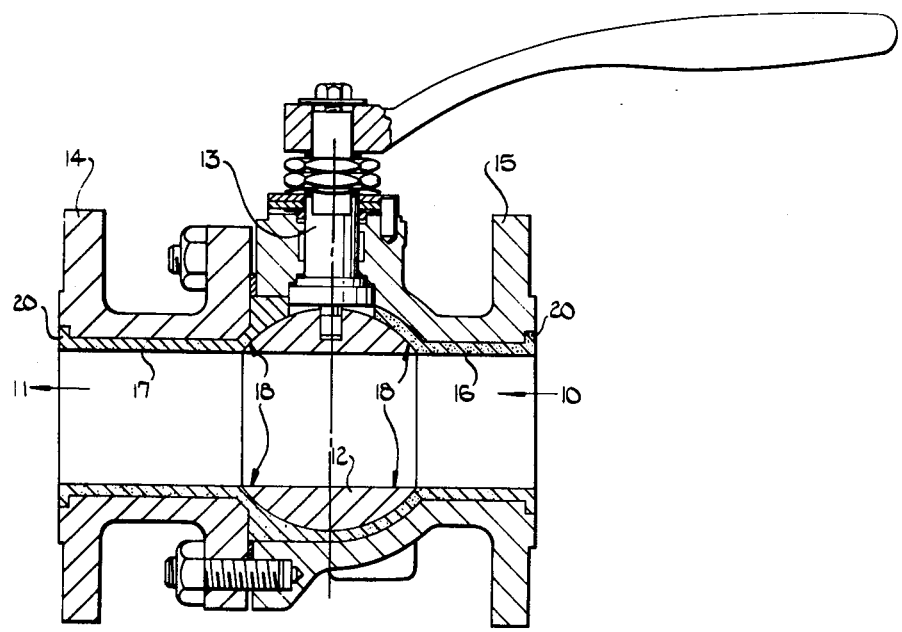
FIG. 1 shows a valve in longitudinal section.

FIG. 1 shows a valve with an inlet 10, an outlet 11 and a ball 12 turned by a stem 13.

The inlet 10 is provided with a half-liner 16 of deformable resilient material, and the outlet 11 with a similar half-liner 17. The half-liners 16, 17, when body portions 14, 15 are tight together, contact one another at the dashed verticl axis line shown in FIG. 1, and are adhered together to form a single liner forming an internal covering of the inlet and outlet passages 10,11, fitting round stem 13 and filling the space between ball 12 and the body 14, 15.

The half-liners 16, 17 may each be provided with annular raised seat portions at 18 surrounding the ends of the orifice in ball 12 when in open position. These portions are compressed against the ball surface and exert a wiping action on that surface when the ball is turned.

Figure 2:
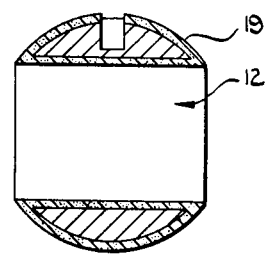
FIG. 2 shows in section a modified ball and a liner therefor.

Optionally, ball 12 may be provided with a liner 19 covering its outer surface and the surface of its aperture. FIG. 2 shows the construction of such a liner.

Body liner parts 16 and 17 are made flexible enough to be easily distorted for insertion through outlet 11 (or inlet 10). Flanges 20 are provided, which are compressed when pipes are connected to give a good seal at the pipe-to-valve joints.

Since the liner 16, 17 substantially fills the space between ball 12 and body 14, 15 and since the seat portions at 18 tend to scrape material from the surface of ball 12 while turning, none of the material handled by the valve can lodge in that space and the ball remains easy to turn. The lining of the interior of inlet 10 and outlet 11 and of the ball orifice prevents abrasion or corrosion by the material handled.

The liners 16, 17 are easily replaced if damaged or worn.

Various changes and modifications may be made in the arrangements described without departing from the invention claimed.

I claim:

1. A ball-valve of the type having:

a first body portion;

a ball chamber in said first body portion;

an inlet passage in said first body portion, leading to said ball chamber;

a second body portion releasably mounted on said first body portion on the oposite side of said ball chamber to said inlet passage;

a outlet passage in said second body portion leading to said ball chamber;

a diametrically apertured ball in the ball chamber;

means for rotating the ball to open or close the way from the inlet passage to the outlet passage;

replaceable resilient liner means encasing the ball and filling a cavity in said ball chamber around said ball between said body portion and said rotating means, said liner means including a first tubular extension forming an internal liner for said inlet passage, and a second tubular extension forming an internal liner for said outlet passage; an annular face being formed on said liner means in the region thereof encasing the ball and adjacent said second tubular extension of said liner means, said second body portion being formed with an annular mating face which is adapted to engage said annular face of said lliner means thereby to force and compress said liner means in said cavity.

2. A valve as claimed in claim 1, wherein said liner has raised annular portions surrounding the ball aperture in valve-open position and bearing on the surface of the ball.

* * * * *